Oct. 25, 1966   A. L. CLEMENT   3,280,650
SYNCHRONIZER FOR TRANSMISSION
Filed Dec. 9, 1963   2 Sheets-Sheet 1

ALBERT L. CLEMENT
INVENTOR.

BY Herbert J. Brown

ATTORNEY

Oct. 25, 1966 A. L. CLEMENT 3,280,650
SYNCHRONIZER FOR TRANSMISSION
Filed Dec. 9, 1963 2 Sheets-Sheet 2

ALBERT L. CLEMENT
INVENTOR.

BY *Herbert J. Brown*

ATTORNEY

United States Patent Office 3,280,650
Patented Oct. 25, 1966

3,280,650
SYNCHRONIZER FOR TRANSMISSION
Albert L. Clement, 2401 White Settlement Road,
Fort Worth, Tex.
Filed Dec. 9, 1963, Ser. No. 329,172
6 Claims. (Cl. 74—339)

This invention relates to a synchronized transmission mechanism, and it concerns more particularly certain specific improvements in a particular type of transmission as hereinafter described which is generally well known and has been used extensively heretofore in automotive vehicles.

Transmissions of the so-called synchronized type ordinarily comprise a structure which includes a housing, a first shaft and a second shaft each rotatable about its axis arranged coaxially relative to each other and journaled in opposite ends of the housing, said first shaft being driven and having an axial bore in an enlarged end portion thereof in which a reduced end portion of said second shaft is journaled, a third shaft extending between opposite ends of said housing in parallel spaced apart relation to said first and second shafts and secured against rotation about its axis, a first sleeve surrounding said third shaft and rotatable thereon, and meshing gears on said first shaft and said first sleeve whereby said first sleeve is rotatable in an opposite direction in response to rotation of said first shaft.

Synchronized transmissions usually include a second sleeve surrounding said second shaft and rotatable thereon, meshing gears on said first and second sleeves whereby said second sleeve is rotatable in the same direction in response to rotation of said first shaft, said enlarged end portion of said first shaft and second sleeve being of like outside diameter and having like external splines, said second shaft having an enlarged intermediate portion adjacent said reduced end portion between said enlarged end portion of said first shaft and said second sleeve and having a diameter corresponding to the outside diameter of said enlarged end portion of said first shaft and second second sleeve and having like splines thereon, and a third sleeve surrounding said enlarged intermediate portion of said second shaft and having internal splines for engagement with the splines of said enlarged intermediate portion of said second shaft and for simultaneous engagement with the splines of said enlarged end portion of said first shaft, or alternatively, the splines of said second sleeve, upon selective movement of said third sleeve longitudinally in opposite directions from a neutral position to a position corresponding to the high gear position of the transmission in which the first and second shafts are connected directly to each other by said third sleeve, or to a position corresponding to the second gear position of the transmission in which the first and second shafts are connected to each other by said third sleeve together with said first and second sleeves and said connecting gears.

Synchronized transmissions commonly further include, in a structure as described, a fourth sleeve surrounding said third sleeve having internal splines in engagement with corresponding external splines on said third sleeve, a pair of longitudinally spaced gears on said first sleeve intermediate its ends, a gear rotatably mounted eccentrically of one of the gears of said pair and meshing therewith, and a gear on said fourth sleeve for engagement with the other of the gears of said pair, or alternatively, said last mentioned gear, upon selective movement of said fourth sleeve longitudinally in opposite directions from a neutral position to a position corresponding to the low gear position of the transmission in which said first and second shafts are connected to each other by said first, third and fourth sleeves and connecting gears including said other of the gears of said pair, or to a position corresponding to the reverse position of the transmission in which said first and fourth sleeves are connected by connecting gears including said gear rotatably mounted eccentrically of said one of the gears of said pair and meshing therewith whereby said second shaft is rotatable in an opposite direction relative to the direction of rotation of said first shaft.

A distinguishing feature of synchronized transmissions as ordinarily constructed is that said third sleeve usually has cylindrical cavities in opposite end portions thereof, said cavities having oppositely facing internally tapered annular bronze bushings rigidly positioned therein for frictional engagement, respectively, with a pair of oppositely facing externally tapered clutch rings which are internally splined for engagement with the splines of said enlarged end portion of said first shaft and said second sleeve, whereby said third sleeve is caused to rotate said second shaft at the same speed as said first shaft or said second sleeve, as the case may be, as said third sleeve is advanced longitudinally in either direction, as above described, before engaging the internal splines thereof with the corresponding splines of said enlarged end portion of said first shaft or the splines of said second sleeve.

A disadvantage of synchronized transmissions as ordinarily constructed is that they tend to jump out of their high gear position and it is sometimes necessary to hold them in place manually, which commonly results in excessive wear and breakage of the fork lever and the flange on said third sleeve which coacts therewith to operate the transmission to shift the gears thereof.

Another disadvantage of synchronized transmissions as ordinarily constructed is that the position of the oppositely facing internally and externally tapered bushings and clutch rings between opposite end portions of said third sleeve and said enlarged end portion of said first shaft and said second sleeve, respectively, do not insure smooth positive operation of the transmission but is troublesome from the standpoint of desired continued efficient operation as well as maintenance thereof.

In one form of this invention a split washer characterized by its inherent spring tension and having an inside diameter corresponding substantially to the diameter of said reduced end portion of said second shaft immediately adjacent said enlarged intermediate portion thereof, and having an outside diameter corresponding substantially to the inside diameter of the internally splined surfaces of said third sleeve, and which is biased radially outwardly while at the same time being yieldable so that it is adapted to be depressed radially inwardly, is received on said reduced end portion of said second shaft between said enlarged intermediate portion thereof and said enlarged end portion of said first shaft.

In operation, as said third sleeve is advanced longitudinally in the direction of said enlarged end portion of said first shaft as actuated by the fork lever, upon approaching the high gear position of the transmission, said split washer is depressed slightly whereby it is received in the adjacent end of said third sleeve in frictional engagement with its internally splined surfaces to thereby secure said third sleeve against longitudinal displacement relative to said enlarged end portion of said first shaft.

Said third sleeve may have portions of its internally splined surfaces in opposing relation to said split ring in the high gear position of the transmission, milled to form slight depressions therein spaced longitudinally inwardly from their adjacent ends for frictional engagement by said split ring to further prevent displacement thereof from said third sleeve, to positively secure said third sleeve in place relative to said enlarged end portion of said first shaft.

A modified form of the invention also contemplates a novel arrangement in which the outer end of the bore of said enlarged end portion of said first shaft is internally tapered; and an externally tapered, oppositely facing bronze bushing is received on said reduced end portion of said second shaft between said enlarged end portion of said first shaft and said enlarged intermediate portion of said second shaft. A split washer, as above described, is received on a reduced end portion of said bushing immediately adjacent said enlarged intermediate portion of said second shaft, and both said bushing and said split washer are secured against rotation relative to said second shaft.

In operation, as said third sleeve is advanced relative to said enlarged portion of said first shaft, its speed of rotation is synchronized with the rotation of said first shaft by frictional engagement between said bushing and said internally tapered bore in the end of said first shaft. As the internal splines of said third sleeve engage the external splines of the end portion of the first shaft, said split washer is depressed and frictionally engages the inner circumference of said internal splines as previously described thereby holding said third sleeve in the high gear position.

In a further modification, the invention contemplates an arrangement in which a split washer as above described surrounds said second shaft and is positioned between said enlarged intermediate portion thereof and said second sleeve and wherein an inwardly tapered bronze bushing is received in a cylindrical cavity formed in a gear on said second sleeve meshing with a corresponding gear on said first sleeve as above described, on the side thereof opposite said enlarged intermediate portion of said second shaft, and an externally tapered clutch ring surrounds said second shaft, in opposing relation to said last mentioned bushing. Said externally tapered clutch ring is secured against rotation relative to said second shaft, and is positioned between said second sleeve and a thrust ring on said second shaft in abutting engagement with the adjacent end of the housing.

In operation, as said third sleeve is advanced relative to said second sleeve its speed of rotation is synchronized with rotation of said second sleeve by frictional engagement between said bushing and said clutch ring. As the internal splines of said third sleeve engage the external splines of said second sleeve, said split ring frictionally engages the inner circumference of said internal splines, thereby holding said third sleeve in the second gear position.

The invention will be readily understood by referring to the following description and the accompanying drawing in which.

Figures 1, 2, 3, 4:
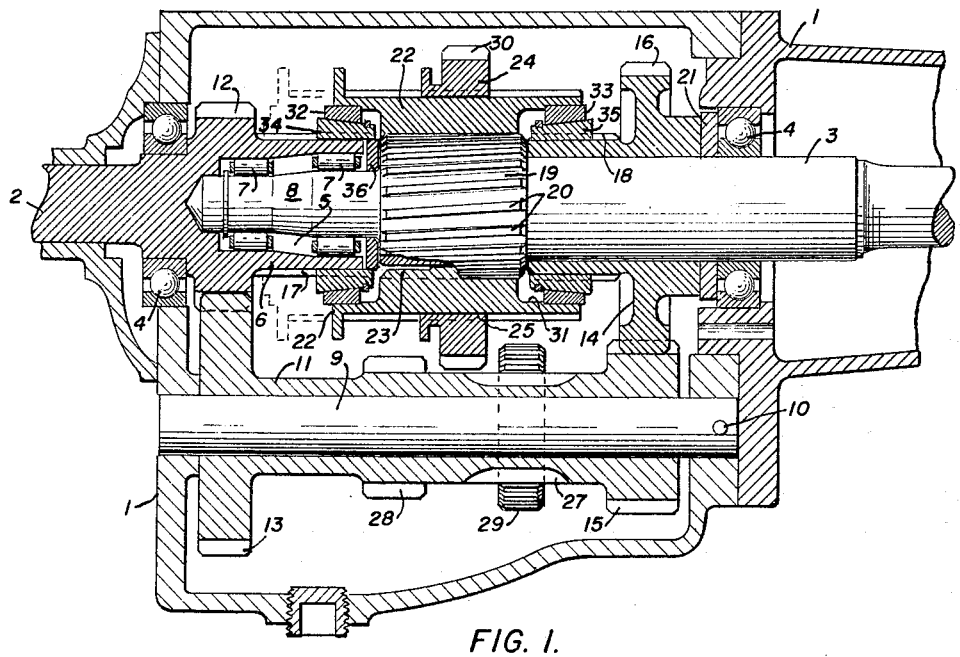
FIGURE 1 is a longitudinal sectional and elevational view, taken on a median line, of a synchronized transmission as above described having one for of the invention incorporated therein.
FIGURE 2 is a transverse sectional view on an enlarged scale showing said reduced end portion of said second shaft and showing said split washer applied thereto.
FIGURE 3 is a fragmentary exploded perspective view on an enlarged scale, partly broken away to show details of construction, showing said split washer in its relation to said enlarged intermediate portion of said second shaft and said third sleeve.
FIGURE 4 is a perspective view showing the side of said split washer opposite the side thereof shown in FIGURE 2.

Referring to FIGURE 1 of the drawing, the numeral 1 designates generally a transmission housing, which may be of any suitable construction. A first shaft 2 and a second shaft 3, each of which is rotatable about its axis, are arranged coaxially relative to each other and are journaled in bearings 4 in opposite ends of the housing 1.

The first shaft 2, which is driven, has an axial bore 5 in an enlarged end portion 6 thereof, and the axial bore 5 has bearings 7 therein in which a reduced end portion 8 of the second shaft 3 is journaled.

A third shaft 9 extends between opposite ends of the housing 1 in parallel, spaced apart relation to the first and second shafts 2, 3, and is secured against rotation about its axis as at 10.

A first sleeve 11 surrounds the third shaft 9 and is rotatable thereon, and meshing gears 12, 13 on the first shaft 2 and the first sleeve 11 cause the first sleeve 11 to be rotated in an opposite direction in response to rotation of the first shaft 2.

A second sleeve 14 surrounds the second shaft 3 and is rotatable thereon, and meshing gears 15, 16 on the first and second sleeves 11, 14 cause the second sleeve 14 to be rotated in the same direction in response to rotation of the first shaft 2.

The enlarged end portion 6 of the first shaft 2 and the second sleeve 14 are of like outside diameter and have like external splines as at 17, 18. The second shaft 3 has an enlarged intermediate portion 19 adjacent the reduced end portion 8 thereof, between the enlarged end portion 6 of the first shaft 2 and the second sleeve 14, having a diameter corresponding to the outside diameter of the enlarged end portion 6 of the first shaft 2 and the second sleeve 14 and having like splines 20 thereon.

A pair of thrust rings 21, which surround the second shaft 3, are positioned between the second sleeve 14 and the adjacent end of the housing 1.

A third sleeve 22, which surrounds the enlarged intermediate portion 19 of the second shaft 3, has internal splines 23 for engagement with the splines 20 of the enlarged intermediate portion 19 of the second shaft 3 and for simultaneous engagement with the splines 17 of the enlarged end portion 6 of the first shaft 2, or alternatively, the splines 18 of the second sleeve 14, upon selective movement of the third sleeve 22 longitudinally in opposite directions from a neutral position to a position corresponding to the high gear position of the transmission in which the first and second shafts 2, 3 are connected directly to each other by the third sleeve 22, or to a position corresponding to the second gear position of the transmission in which the first and second shafts 2, 3 are connected to each other by the third sleeve 22 together with the first and second sleeves 11, 14 and the connecting gears 12, 13 and 15, 16.

A fourth sleeve 24, which surrounds the third sleeve 22, has internal splines 25 in engagement with corresponding external splines 26 on the third sleeve 22.

A pair of longitudinally spaced gears 27, 28 are formed on the first sleeve 11 intermediate its ends and are rotatable therewith. A gear 29 is rotatably mounted laterally of the gear 27 and meshes therewith, and a gear 30 on the fourth sleeve 24 is engageable with the gear 28, or alternatively, the gear 29, upon selective movement of the fourth sleeve 24 longitudinally in opposite directions from a neutral position to a position corresponding to the low gear position of the transmission in which the first and second shafts 2, 3 are connected to each other by the first, third, and fourth sleeves 11, 22, 24 and connecting gears including the gear 28, or to a position corresponding to the reverse position of the transmission in which the first and fourth sleeves 11, 24 are connected by connecting gears including the gear 29 whereby the second shaft 3 is rotatable in an opposite direction relative to the direction of rotation of the first shaft 2.

The third sleeve 22 has cylindrical cavities 31 in opposite end portions thereof which, as shown in FIGURE 1, has oppositely facing internally tapered bronze bushings 32, 33 rigidly positioned therein for frictional engagement, respectively, with a pair of oppositely facing externally tapered clutch rings 34, 35 which are internally splined for engagement with the splines 17 of the enlarged end portion 6 of the first shaft 2 and the second sleeve 14, whereby the third sleeve 22 is caused to rotate the second shaft 3 at the same speed as the first shaft 2 or the second sleeve 14, as the case may be, as the third sleeve 22 is advanced longitudinally in either direction, as above described, before engaging the internal splines 23 thereof with the corresponding splines 17 of the enlarged end portion 6 of the first shaft 2 or the splines 18 of the second sleeve 14.

In accordance with this invention, as illustrated in FIGURES 1 to 4, a split washer 36, which is characterized by its inherent spring tension and has an inside diameter corresponding substantially to the diameter of the reduced end portion 8 of the second shaft 3 immediately adjacent the enlarged intermediate portion 19 thereof, and has an outside diameter corresponding substantially to the inside diameter of the internally splined surfaces 23 of the third sleeve 22, and which is biased radially outwardly while at the same time being yieldable so that it is adapted to be depressed radially inwardly, is received on the reduced end portion 8 of the second shaft 3, between the enlarged intermediate portion 19 thereof and the enlarged end portion 6 of the first shaft 2.

In operation, as the third sleeve 22 is advanced longitudinally in the direction of the enlarged end portion 6 of the first shaft 2 as actuated by the fork lever (not shown), upon approaching the high gear position of the transmission, the split washer 36 is depressed slightly whereby it is received in the adjacent end of the third sleeve 22, in frictional engagement with its internally splined surfaces 23, to thereby yieldably secure the third sleeve 22 against accidental longitudinal displacement relative to the enlarged end portion 6 of the first shaft 2.

As shown in FIGURE 3, the third sleeve 22 has portions of its internally splined surfaces 23 in opposing relation to the split ring 36, in the high gear position of the transmission, milled to form slight depressions 37 therein spaced longitudinally from their adjacent ends for frictional engagement by the split ring 36 to further prevent displacement thereof from the third sleeve 22, to more positively secure the third sleeve 22 in place relative to the enlarged end portion 6 of the first shaft 2.

As shown in FIGURE 4, the split ring 36 has a plurality of transverse grooves 38 in the side thereof opposite the enlarged intermediate portion 19 of the second shaft 3 for use as fluid passages for the escape of greese and the like to insure positive operation of the split ring 36 in the manner described.

Figure 5:
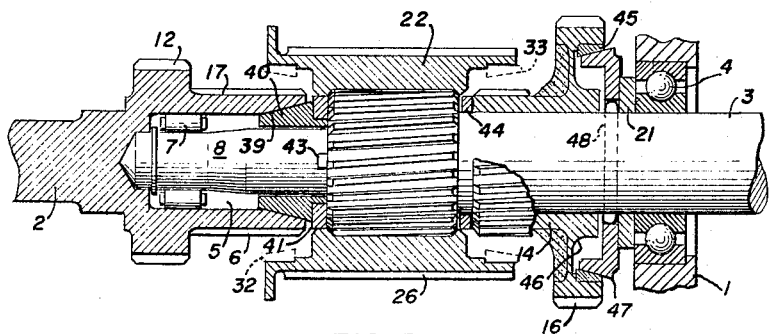
FIGURE 5 is a fragmentary view similar to FIGURE 1 showing the above described modifications of the invention.
Figure 6:
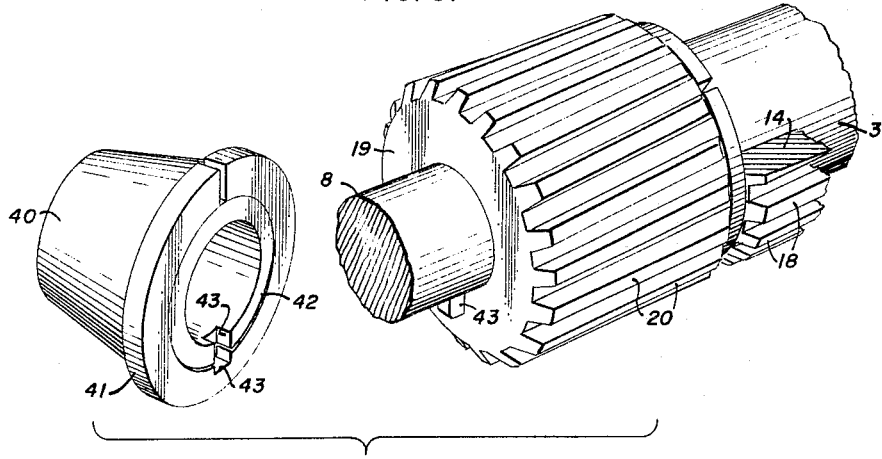
FIGURE 6 is a fragmentary exploded perspective view on an enlarged scale, partly broken away to show details of construction, showing fragmentarily said second shaft and said second sleeve and showing the split rings on opposite sides of said enlarged intermediate portion of said second shaft, and showing said externally tapered bronze bushing in its relation to the corresponding split ring.
Figure 7:
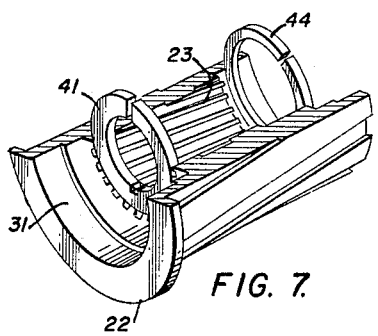
FIGURE 7 is a perspective view, partly in longitudinal section taken on a median line, showing said third sleeve and showing said split rings in their relation thereto, in the high gear position of the transmission.

In a modified form of the invention as illustrated in FIGURES 5 to 7, the outer end of the bore 5 of the enlarged end portion 6 of the first shaft 2 is internally tapered as at 39 and an externally tapered, oppositely facing bronze bushing 40 is received on the reduced end portion 8 of the second shaft 3, between the enlarged end portion 6 of the first shaft 2 and the enlarged intermediate portion 19 of the second shaft 3. A split washer 41 similar to the split washer 36 shown in FIGURES 1 to 4 is received on a reduced end portion 42 of the bushing 40, immediately adjacent the enlarged intermediate portion 19 of the second shaft 3, and both the bushing 40 and the split washer 41 are keyed on the second shaft 3 as at 43.

In operation, the third sleeve 22 and the second shaft 3 are brought to the same speed of rotation as the first shaft 2 as the third sleeve 22 is advanced relative to the enlarged end portion 6 of the first shaft 2, by frictional engagement of the bushing 40 with the internally tapered end 39 of the bore 5, allowing the splines 23 of the third sleeve 22 to engage with the splines 17 of the enlarged end portion 6 of the first shaft 2, while at the same time the split washer 41 is depressed and the split washer 41 and the tapered bushing 40 are frictionally engaged to the third sleeve 22, upon approaching the high gear position of the transmission.

In a further modification of the invention as illustrated in FIGURES 5 to 7, a split washer 44, which is similar to the split washers 36 and 41, surrounds the second shaft 3 and is positioned between the enlarged intermediate portion 19 thereof and the second sleeve 14. An inwardly tapered bronze bushing 45 is received in a cylindrical cavity 46 formed in the gear 16 on the second sleeve 14, which meshes with the corresponding gear 15 on the first sleeve 11 as above described, on the side of the gear 16 opposite the enlarged intermediate portion 19 of the second shaft 3, and an externally tapered clutch ring 47 surrounds the second shaft 3, in opposing relation to the bushing 45. The externally tapered clutch ring 47 is keyed on the second shaft 3 as at 48, and is positioned between the second sleeve 14 and a thrust ring 21 as above mentioned, which is positioned on the second shaft 3 in abutting engagement with the adjacent end of the housing 1.

In operation, the third sleeve 22 and the second shaft 3 are brought to the same speed of rotation as the second sleeve 14, as the third sleeve 22 is advanced relative to the second sleeve 14, by frictional engagement of the bushing 45 with the clutch ring 47, allowing the splines 23 of the third sleeve 22 to engage with the splines 18 of the second sleeve 14, while at the same time the split washer 44 is depressed and is yieldably retracted relative to the third sleeve 22, upon approaching the second gear position of the transmission.

The invention is not limited to the exemplary construction herein shown and described, but may be made in various ways within the scope of the appended claims.

What is claimed is:

1. In a syncromesh transmission including a first driving shaft coaxial to a second driven shaft and with the front extended end of said second shaft journaled within the rear end of said first shaft, an externally splined sleeve with a fixed spur gear thereon freely rotating on said second shaft, and having said splines forward of said spur gear, external splines on the rear end of said first shaft parallel to and of like size with the splines on said rotating sleeve, external splines on said second shaft parallel to and of like size with said splines on the first shaft and said splines on said rotating sleeve, and arranged in end to end relation therebetween, a second sleeve having internal splines meshed with the external splines on said second shaft and axially movable thereon, the length of the splined portion of said second sleeve being approximate to the length of the splined portion of said second shaft; means frictionally engaging said second sleeve while in its forward position, said means comprising a split spring washer located between the end of said first shaft and the splined portion of said second shaft and encircling the extended journaled end of said second shaft, said washer, in its relaxed condition, being oversize of said journaled extension, and a like amount oversize of the inner circumference of the internal splines on said second sleeve and compressible to within the inner circumference of said internal splines.

2. The structure of claim 1, said second sleeve having portions of its internally splined surfaces in opposing relation to said split ring, in the high gear position of the transmission, milled to form slight depressions therein spaced longitudinally inwardly from their adjacent ends for frictional engagement by said split ring to further prevent displacement thereof from said second sleeve, to more positively secure said second sleeve in place relative to said enlarged end portion of said first shaft.

3. In a transmission comprising a structure which includes a housing, a first shaft and a second shaft each rotatable about its axis arranged coaxially relative to each other and journaled in opposite ends of the housing, said first shaft being driven and having an axial bore in an enlarged end portion thereof in which a reduced end portion of said second shaft is journaled, a third shaft extending between opposite ends of said housing in parallel, spaced apart relation to said first and second shafts and secured against rotation about its axis, a first sleeve surrounding said third shaft and rotatable thereon, meshing gears on said first shaft and said first sleeve whereby said first sleeve is rotatable in an opposite direction in response to rotation of said first shaft, a second sleeve surrounding said second shaft and rotatable thereon, meshing gears on said first and second sleeves whereby said second sleeve is rotatable in the same direction in response to rotation of said first shaft, said enlarged end portion of said first shaft and said second sleeve being of like outside diameter and having like external splines, said second shaft having an enlarged intermediate portion adjacent said reduced end portion, between said enlarged end portion of said first shaft and said second sleeve, having a diameter corresponding to the outside diameter of said enlarged end portion of said first shaft and said second sleeve and having like splines thereon, and a third sleeve surrounding said enlarged intermediate portion of said second shaft and having internal splines for engagement with the splines of said enlarged intermediate portion of said second shaft and for simultaneous engagement with the splines of said enlarged end portion of said first shaft, or alternatively, the splines of said second sleeve, upon selective movement of said third sleeve longitudinally in opposite directions from a neutral position to a position corresponding to the high gear position of the transmission in which said first and second shafts are connected directly to each other by said third sleeve, or to a position corresponding to the second gear position of the transmission in which the first and second shafts are connected to each other by said third sleeve together with said first and second sleeves and said connecting gears, the combination of a split washer characterized by its inherent spring tension and having an outside diameter corresponding substantially to the inside diameter of the internally splined surfaces of said third sleeve, and which is biased radially outwardly while at the same time being yieldable so that it is adapted to be depressed radially inwardly received on said reduced end portion of said second shaft, between said enlarged intermediate portion thereof and said enlarged end portion of said first shaft.

4. The structure of claim 3, the outer end of the bore of said enlarged end portion of said first shaft being internally tapered, and an externally tapered, oppositely facing bronze bushing received on said reduced end portion of said second shaft, between said enlarged end portion of said first shaft and said enlarged intermediate portion of said second shaft, said split washer being received on a reduced end portion of said bushing, immediately adjacent said enlarged intermediate portion of said second shaft, and both said bushing and said split washer being secured against rotation relative to said second shaft.

5. The structure of claim 3, and a split washer surrounding said second shaft and positioned between said enlarged intermediate portion thereof and said second sleeve.

6. The structure of claim 5, an inwardly tapered bronze bushing received in a cylindrical cavity formed in a gear on said second sleeve meshing with a corresponding gear on said first sleeve as above described, on the side thereof opposite said enlarged intermediate portion of said second shaft, and an externally tapered clutch ring surrounding said second shaft, in opposing relation to said last mentioned bushing, said externally tapered clutch ring being secured against rotation relative to said second shaft and being positioned between said second sleeve and a thrust ring on said second shaft in abutting engagement with the adjacent end of the housing.

References Cited by the Examiner
UNITED STATES PATENTS 3,110,382  11/1963  Jones _____ 74—339

FOREIGN PATENTS 906,849  9/1962  Great Britain.

DAVID J. WILLIAMOWSKY, *Primary Examiner.*

H. S. LAYTON, *Assistant Examiner.*